Patented Apr. 25, 1933

1,905,088

UNITED STATES PATENT OFFICE

ROBERT J. GOODRICH AND EDWARD T. HOWELL, OF SOUTH MILWAUKEE, WISCONSIN, ASSIGNORS, BY MESNE ASSIGNMENTS, TO E. I. DU PONT DE NEMOURS & COMPANY, A CORPORATION OF DELAWARE

ANTHRAQUINONE VAT DYES AND A PROCESS OF MAKING THE SAME

No Drawing. Application filed August 8, 1929. Serial No. 384,463.

This invention relates to a process of preparing anthraquinone vat dyes, and more particularly brominated derivatives of dibenzanthrone.

It is an object of this invention to provide a process for the preparation of novel vat dyes having valuable tinctorial properties.

Other and further important objects of this invention will become apparent from the following description and appended claims.

In Example 1 of U. S. Patent No. 1,505,912, there is described a process for preparing a brominated derivative of the product obtained by methylating oxidized dibenzanthrone. The derivative or product thus prepared is apparently a brominated methylated dihydroxy dibenzanthrone and is described as dyeing cotton from a vat brilliant green shades that are more yellowish than the non-halogenated dyestuff.

We have now found that this product is not a single chemical compound, but is divisible into at least two component products of different natures. We have further found that these two components may be readily separated and that the separated components possess properties quite different from each other and from the composite dyestuff. One of these components, which is hereinafter designated component A, constitutes a vat dyestuff dyeing cotton in green shades decidedly more yellowish and more brilliant than the composite product. The other component as obtained, which is hereinafter designated component B, is also more yellowish than the composite product but its dyeings on cotton are dull and not fast to acid. We have found that component B is more valuable as an intermediate for the production of dyestuffs than as a dyestuff itself, since it can be transformed into a product which is relatively fast to acid by treatment with an alkylating agent.

From the latter fact, we conclude that component B apparently is a brominated dihydroxy dibenzanthrone, probably formed by the demethylation of the parent material during the bromination step.

The removal of component B, which is not fast to acid, from the composite product naturally improves the quality of the other component as a dyestuff. It is a surprising fact that the two components of the original dyestuff as obtained after separation are both of a more yellowish shade than the composite product, since it would be naturally expected that one component would be more bluish to offset the increased yellowishness of the other component.

We have found that the relative proportions of these components in the composite product depend on the purity of the starting material, dimethoxy dibenzanthrone, and on the particular conditions of bromination. Nevertheless, the existence of these two components in the above identified product is independent of these two factors and is apparently inherent in the bromination step. Thus, even when a dimethoxy dibenzanthrone, purified according to the disclosures in lines 50 to 60, page 2 of U. S. Patent No. 1,505,912, is employed for bromination according to Example 1 of the above patent, the product is still found to contain two separable components as described above. In other words, although using purified dimethoxy dibenzanthrone as initial material, the product of bromination is a composite product capable of separation.

Our process of separation of the two components A and B comprises in its preferred form a fractional crystallization from concentrated sulfuric acid. We have found that for best results, a sulfuric acid of about 90% concentration should be used and the temperature should be maintained at room temperature, say 30° C. or lower. In the preferred method, the insoluble component, that is, component A, is obtained in the form of microscopic hair-like needles, comprising most probably a complex sulfuric acid compound of the dyestuff. The concentration of acid may be varied, however, within certain limits depending upon the amount of impurity present and upon how complete a separation is desired, the latter to be governed by the quality of dyestuffs desired. If higher concentrations of sulfuric acid are used, say 95%, there is experienced a larger loss of the insoluble component due to solubility. On the other hand, if lower concentrations of sulfuric acid are used, such as 76%, the separation is not so marked. The preferred concentration of the sulfuric acid will likewise depend upon the amount of dyestuff employed.

In any specific case starting with a definite mixture of components, the exact concentration to obtain best results both with respect to the yield and quality can be found by trial. In carrying out our invention in actual practice, the composite dyestuff is dissolved in concentrated sulfuric acid and then partially precipitated therefrom by the addition of a diluent which will decrease the solvent action of the sulfuric acid. As an alternative method, but one which is not preferred, the composite product may be subjected to a treatment with a sulfuric acid of such strength that the soluble component is extracted away from the insoluble component, thus leaving the dyestuff as a residue suspended in the sulfuric acid.

We have further found that the above process can be adapted for use as a means of isolating the brominated product directly from the bromination mass, thus obtaining the new dyestuffs directly in any desired purity.

Our process should not be confused with the known process of obtaining brominated methoxy-dibenzanthrones in finely divided form by dissolving the same in concentrated sulfuric acid and then drowning in water. The latter method has not been employed to the best of our knowledge to effect the separation of components but gives both components in a fine state of subdivision. To the best of our knowledge, no one has before applied our or any other equivalent process to brominated methoxy dibenzanthrones and we believe the dyestuffs as obtained are new and very useful products.

Our invention is furthermore not limited by the amount of bromine which has been introduced into the molecule nor is it merely a separation of the mono, di, or poly-bromination products, although to an extent this occurs. The process is applicable with good success where the amount of bromine corresponds to one atom, two atoms or higher or intermediate amounts of bromine. This invention contemplates and includes broadly the fractional separation of components normally present in a brominated dimethoxy dibenzanthrone mass, into two principal products, one of which dyes cotton in yellowish green shades relatively fast to acid and of great brilliance and the other of which dyes cotton dull green shades, not fast to acid.

Without limiting the invention to any specific method, the following examples are given to illustrate the embodiment of our invention in its preferred form. The parts are by weight.

*Example 1*

10 Parts of dry brominated product as obtained according to Example 1 of U. S. Patent No. 1,505,912 are dissolved in 100 parts of sulfuric acid monohydrate at 10 to 15° C. 11.1 parts of water are then added over a period of several hours, the temperature of the mass being kept below 20° C. The crystals separating in the form of microscopic needles of Bordeaux red color are filtered off on a suction filter and sucked as dry as possible. The filter cake is digested with water and the crystalline precipitate is filtered and washed with water till practically free of acid. The washed product, component A, may be used directly for dyeing or it may first be dried. It dies cotton in green shades considerably yellower than the original product. To the best of our present knowledge, this product is a substantially pure bromination product of dimethoxy dibenzanthrone substantially free from the demethylated by-product.

Upon pouring the filtrate from the microscopic needles into water, a second component is precipitated and can be recovered by filtration. This product, component B, dyes cotton in yellowish green shades which are not fast to acid. It can be further treated for the production of fast vat dyestuffs.

*Example 2*

10 parts of the dry brominated product as obtained according to Example 1, U. S. Patent No. 1,505,912, are dissolved in 100 parts of 99% sulfuric acid with cooling. 73 parts of 60° Bé. sulfuric acid are then added at 10 to 15° C. over a period of several hours. The crystals separating in the form of microscopic hair-like needles are filtered off and worked up further as in Example 1. The product, component A, as obtained is practically identical with that obtained according to Example 1. The mother liquor from the miscroscopic needles can be worked up as in Example 1 to give a similar product.

*Example 3*

27 parts of bromine are added to 100 parts of sulfuric acid monohydrate at about 25° C. There are then added 0.22 parts of iodine and 10 parts of dimethoxy dibenzanthrone, obtainable as described in Example 2 in U. S. Patent No. 1,531,261, the mixture being maintained at room temperature or below. After the product has dissolved in the sulfuric acid the reaction mixture is stirred for about 24 hours at 25 to 30° C. The reaction mixture is then poured into 1000 parts of cold water and the precipitate filtered off and washed practically free of acid with water.

The product is then dried. The dry, crude composite product is then treated as in Example 1 or 2. The product insoluble in the concentrated sulfuric acid, component A, gives dyeings of a much yellower green and more brilliant shade than that of any product obtainable by any known process for producing brominated methoxy dibenzanthrones. It contains substantially two atoms of bromine, and corresponds to dibromo dimethoxy dibenzanthrone. The analysis is: found—23.35% bromine; theory 23.75% bromine.

Component B may be isolated from the strong sulfuric acid filtrate. Component B dyes cotton in green shades which are not fast to acid, but may be used for the further production of fast vat dyestuffs.

*Example 4*

The bromination of the dimethoxy dibenzanthrone is carried out as in Example No. 3. The reaction mass before pouring into water, however, is slowly diluted with either 11.1 parts of cold water or 81 parts of 60° Bé. sulfuric acid keeping the temperature at 20° C. or below. 15.6 parts of sodium bisulfite are then added carefully. Crystals of component A precipitate and can then be filtered off and worked up further as in Example 1.

The product obtained is practically identical with that obtained according to Example 3. Component B may be isolated from the strong acid filtrate by further dilution of the filtrate with much water. This second component dyes cotton in yellowish shades which are not fast to acid but may be further used for the production of fast vat dyestuffs.

*Example 5*

3 parts of dry brominated methoxy dibenzanthrone, obtained as described in Example 3 after drowning with water, are dissolved in 60 parts of sulfuric acid 98–100% with cooling, care being taken that the temperature does not exceed about 25° C. 10 parts of glacial acetic acid are then added slowly and cautiously. The Bordeaux colored needles are filtered off on a suction filter and sucked as dry as possible. The filter cake is digested in water, filtered again and washed practically acid free. The wet cake may be used as such or it may be dried. The product is practically identical in properties to component A obtained in Example 3.

*Example 6*

5 parts of the product obtained by drying the dyestuff known commercially as Indanthrene Brilliant Green 2 G Double Paste (halogen content 17.76%, calculated as bromine) are dissolved in 100 parts of sulfuric acid (100%) at a temperature of 5 to 10° C. 11 parts of water are added with cooling and stirring over a period of about an hour. A precipitate forms which when examined under the microscope shows Bordeaux colored hair-like needles. These are filtered off on a porous plate and sucked as dry as possible. The filter cake is digested in water, filtered, and washed acid free. The product so obtained consists of a dark purple powder with bronzy luster when dry, and gives on cotton dyeings much brighter than the original material. The halogen content of this product, calculated as bromine, is 21.22%.

The strong sulfuric acid mother liquor obtained in the first filtration above, gives upon drowning in water, a second component, similar to component B in the preceding examples. Its halogen content, calculated as bromine, is 14.32%.

The dyestuff, component A, as for example that obtained in Example 3, dissolves in concentrated sulfuric acid with a cherry red color and in fuming sulfuric acid with a color which remains dull orange on standing and which does not change color upon addition of boric acid. It dissolves in chloro-benzene or nitro-benzene with a bright yellowish green color. In contrast to this, the composite product of Example 3 before separating it into components dissolves in concentrated sulfuric acid with a dull brown color. The component A dyestuff dyes cotton in yellowish green shades, much yellower and much more brilliant than the known products of this series.

In the claims below it should be understood that where new products, dyestuffs, or articles of manufacture are claimed, we mean to include those bodies not only in substance, but also in whatever state they exist when applied to material dyed, printed or pigmented therewith.

We are aware that numerous details of the process may be varied through a wide range without departing from the principles of this invention, and we, therefore, do not purpose limiting the patent granted hereon otherwise than necessitated by the prior art.

We claim as our invention:

1. The process of separating a bromine containing methylated dihydroxy dibenzanthrone product into two fractions, which comprises mixing said dibenzanthrone product with concentrated sulfuric acid and separating one portion from the other.

2. The process of separating a bromine containing methylated dihydroxy dibenzanthrone product into two fractions, which comprises mixing said dibenzanthrone product at temperatures below 30° C. with concentrated sulfuric acid of not less than 76% and not over 95% strength and separating one portion from the other.

3. The process of separating a methylated dihydroxy dibenzanthrone product containing bromine into two fractions, which comprises dissolving said dibenzanthrone product in concentrated sulfuric acid above 90% strength and diluting the acid with an inert diluent to approximately 90% strength at temperatures below 30° C. to maintain one of said components in solution while effecting the precipitation of another component.

4. The process of separating a methylated dihydroxy dibenzanthrone product containing bromine into two components, which includes fractionally crystallizing of one of said components from varying concentrations of sulfuric acid and removing the crystalline portion from the mother liquor.

5. The process of preparing a substantially pure brominated dimethoxy dibenzanthrone, which comprises dissolving a brominated derivative of methylated dibenzanthrone in sulfuric acid above 90% concentration, diluting said acid with an inert diluent to approximately 90% concentration and separating the product that precipitates out.

6. In the process of preparation of a yellowish-green vat dyestuff by the bromination of a methylation product of dihydroxy dibenzanthrone, the improvement which comprises freeing the product from the demethylated or incompletely methylated fractions by mixing with concentrated sulfuric acid and separating the insoluble completely methylated product from the mother liquor.

7. The process of preparing a yellowish green dyestuff which comprises reacting dimethoxy dibenzanthrone dissolved in concentrated sulfuric acid with bromine until substantially 2 atomic weights of bromine have been absorbed per mole of the dibenzanthrone body, slowly diluting the concentration of the acid with an inert diluent until a Bordeaux colored precipitate is formed, and recovering the precipitate.

8. As a new product, a dyestuff composed of substantially pure brominated dimethoxy dibenzanthrone.

9. As a new product, a dyestuff composed of substantially pure dibromo dimethoxy dibenzanthrone.

In testimony whereof we have hereunto subscribed our names at Carrollville, Milwaukee County, Wisconsin.

ROBERT J. GOODRICH.
EDWARD T. HOWELL.